(12) United States Patent
Triola

(10) Patent No.: US 7,127,406 B2
(45) Date of Patent: Oct. 24, 2006

(54) METHOD AND APPARATUS FOR PROCESSING ESCROW TRANSACTIONS

(76) Inventor: C. Richard Triola, 259 Lower Cliff Dr. #612, Laguna Beach, CA (US) 92651

(*) Notice: Subject to any disclaimer, the term of this patent is extended or adjusted under 35 U.S.C. 154(b) by 318 days.

(21) Appl. No.: 09/833,390

(22) Filed: Apr. 11, 2001

(65) Prior Publication Data

US 2001/0047328 A1    Nov. 29, 2001

Related U.S. Application Data

(60) Provisional application No. 60/198,785, filed on Apr. 20, 2000.

(51) Int. Cl.
*G06Q 50/00* (2006.01)
(52) U.S. Cl. ......................................................... 705/1
(58) Field of Classification Search .................. 705/1, 705/26, 27, 37; 235/381, 380
See application file for complete search history.

(56) References Cited

U.S. PATENT DOCUMENTS

| | | | |
|---|---|---|---|
| 4,876,648 A | 10/1989 | Lloyd | 364/408 |
| 5,615,268 A | 3/1997 | Bisbee et al. | 380/25 |
| 5,644,726 A | 7/1997 | Oppenheimer | 395/238 |
| 5,745,706 A | 4/1998 | Wolfberg et al. | 395/235 |
| 5,875,435 A * | 2/1999 | Brown | 705/30 |
| 5,924,082 A | 7/1999 | Silverman et al. | 705/37 |
| 5,930,776 A | 7/1999 | Dykstra et al. | 705/38 |
| 5,940,811 A | 8/1999 | Norris | 705/38 |
| 5,966,699 A | 10/1999 | Zandi | 705/38 |
| 5,983,206 A | 11/1999 | Oppenheimer | 705/38 |
| 5,991,745 A | 11/1999 | Kiritz | 705/38 |
| 5,995,947 A | 11/1999 | Fraser et al. | 705/38 |
| 6,012,047 A | 1/2000 | Mazonas et al. | 705/38 |
| 6,016,482 A | 1/2000 | Molinari et al. | 705/35 |
| 6,029,149 A | 2/2000 | Dykstra et al. | 705/38 |
| 6,223,169 B1 * | 4/2001 | Mori et al. | 705/41 |
| 6,260,024 B1 * | 7/2001 | Shkedy | 705/10 |
| 6,304,860 B1 * | 10/2001 | Martin et al. | 705/43 |
| 6,343,273 B1 * | 1/2002 | Nahan et al. | 705/5 |
| 6,343,738 B1 * | 2/2002 | Ogilvie | 705/26 |
| 6,594,633 B1 * | 7/2003 | Broerman | 705/1 |
| 2002/0023036 A1 * | 2/2002 | Meder | 705/36 |
| 2002/0046144 A1 * | 4/2002 | Graff | 705/36 |
| 2002/0049624 A1 * | 4/2002 | Raveis, Jr. | 705/8 |

OTHER PUBLICATIONS

PCT Notification of Transmittal of The International Search Report or the Declaration, Aug. 22, 2001, 5 pages.
PCT/US01/13021, Written Opinion and Search Report, May 1, 2002, Geoffrey Akers, Vincent Millin, James R. Matthews.

* cited by examiner

*Primary Examiner*—James P. Trammell
(74) *Attorney, Agent, or Firm*—Ladas & Parry LLP

(57) ABSTRACT

The apparatus and method implements, manages, and tracks on-line digital transactions via an escrow, including opening, servicing, real-time or near-real time status of the broker, title company, lender, vendor, buyer and seller, and closing of an escrow via a medium such as the internet. Multiple access methods are employed. The present invention provides computerization and internet type process implementation for escrow processes including, but not limited to, digital transaction coordination, digital status coordinators, seamless escrow transactions, on-line digital signatures, video signature authentication, digital certificate authentication, signature authentication, satellite and other wireless transmission of escrow transactions, voice digital instruction, the merging of voice with digital data transactions, set-top/webTV digital escrow transmission, global digital escrow networking, and the like. The system includes appropriate data, application, and servers along with supporting LAN or WAN-based application to perform escrow services.

18 Claims, 6 Drawing Sheets

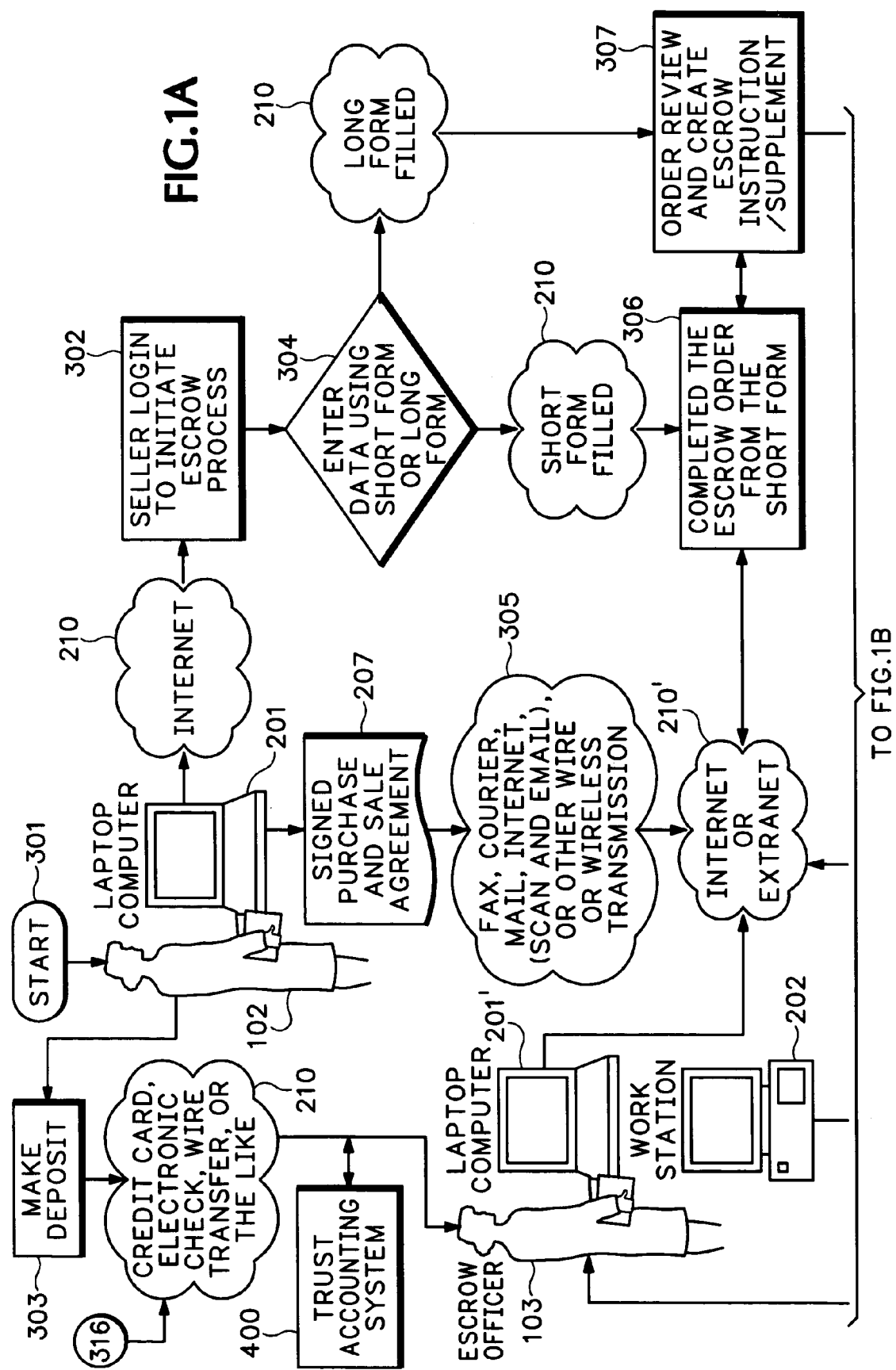

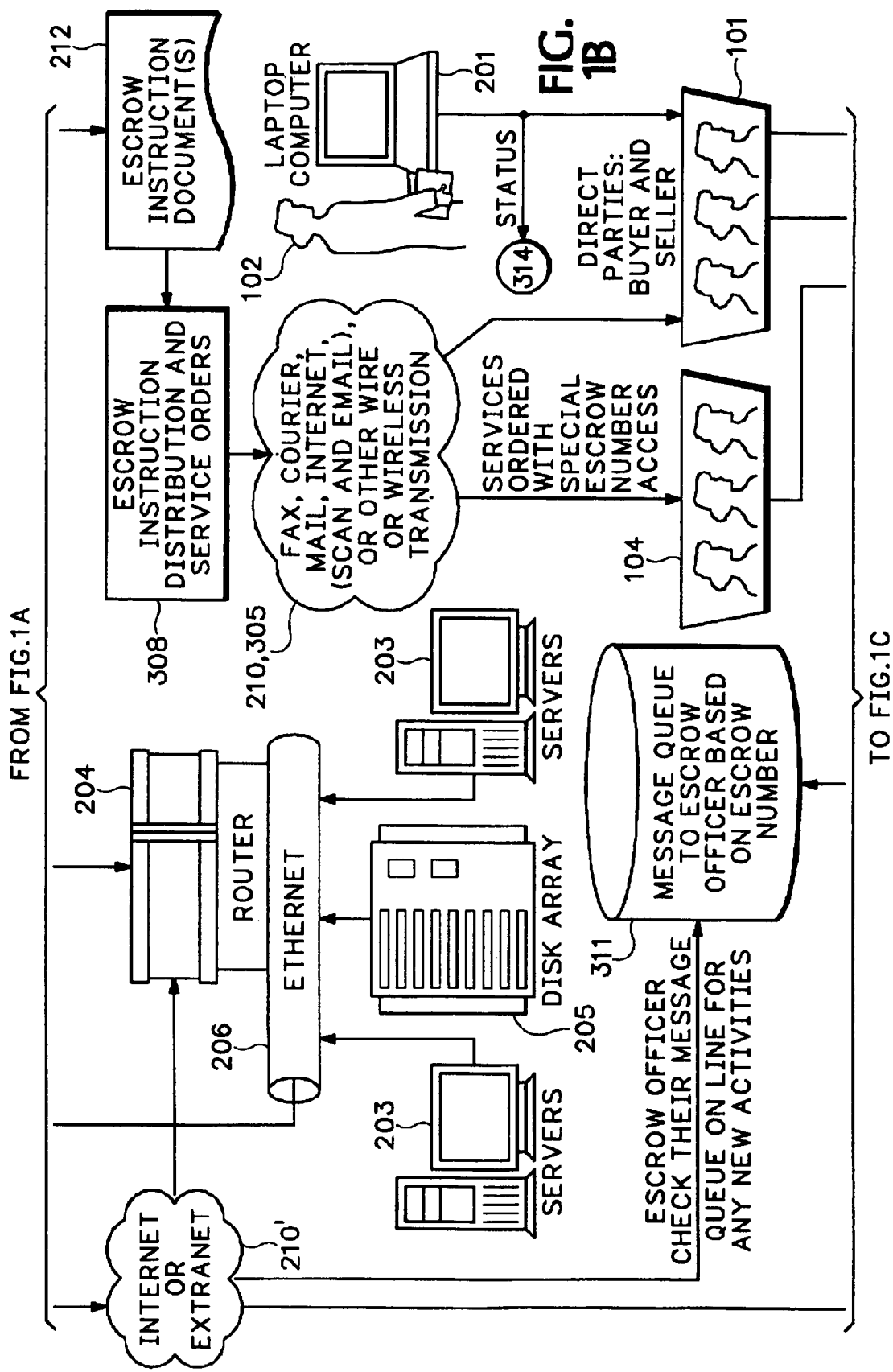

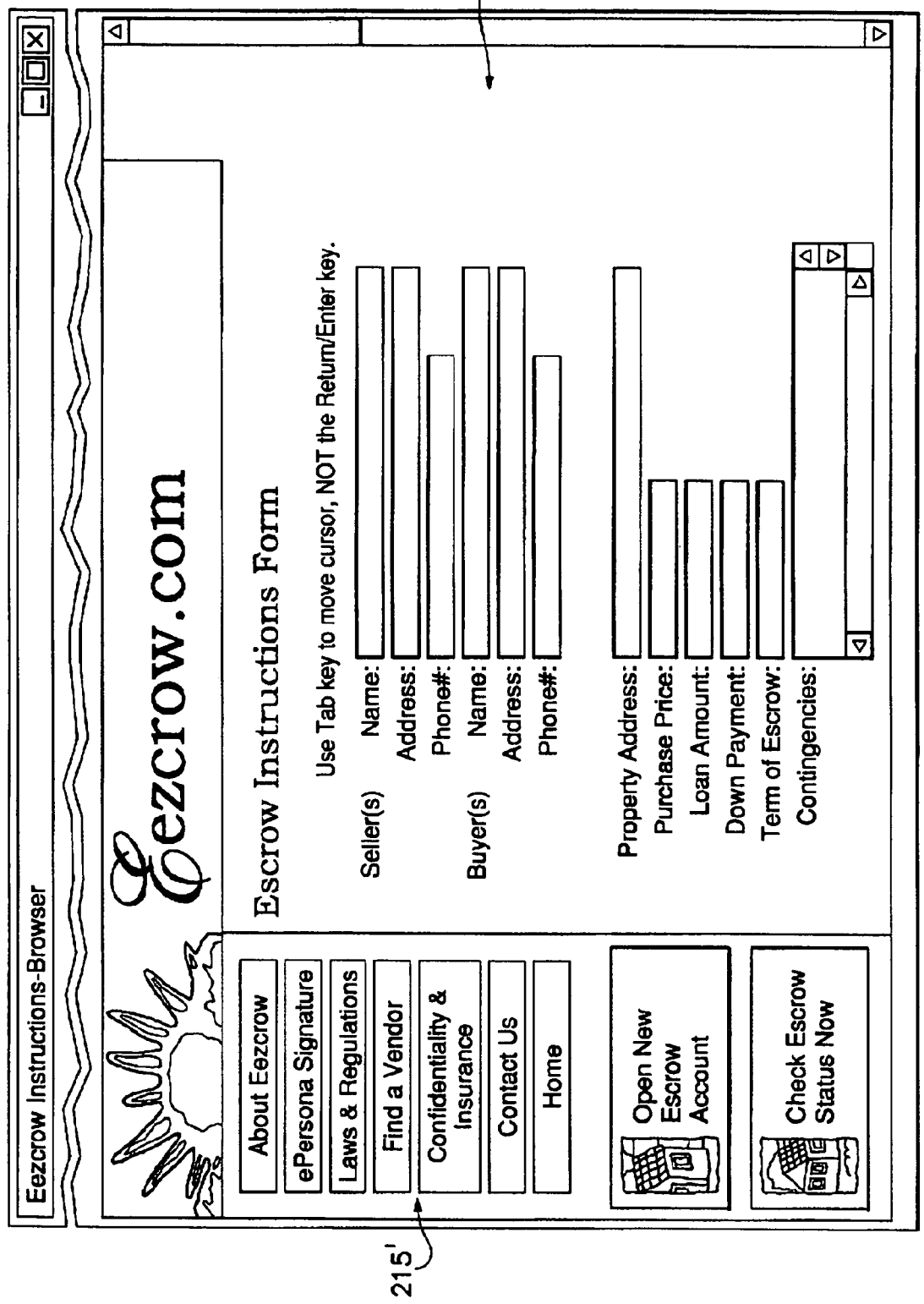

FIG.4

Eezcrow.com

Sellers Agent's Escrow Status

Hello SALLY SELLER,

Thank you for using Eezcrow to check your current SELLERS AGENT status as of October 21, 2000.

ALERT: HOME INSPECTION REPORT
An email was sent to you at 2:17 P.M. October 21, 2000 to alert you that the HOME INSPECTION REPORT have been completed on property at 1717 MAIN STREET, ANYTOWN, CA.

Click Here For Full Status

Status on All Agent Documents

1. Executed Loan Documents:     COMPLETED
2. Copy of Escrow Instructions:     COMPLETED
3. Copy of Amended escrow Instructions:     COMPLETED
4. Certified Copy of Estimated Closing Statements:     COMPLETED
5. Natural Hazard Disclosure     WAITING
6. Termite report:     WAITING
7. Copy of grant Deed     WAITING
\*. Letter of Explanation:     WAITING
9. Copy of final HUD/RESPA Settlement Statements to Borrower:     WAITING
10. To Agent-Copy of Closing Statement:     WAITING
11. Commission Check:     WAITING Sidebar:
- About Eezcrow
- ePersona Signature
- Laws & Regulations
- Find a Vendor
- Confidentiality & Insurance
- Contact Us
- Home
- Submit forms with digital signatures
- Download forms
- View completed forms

METHOD AND APPARATUS FOR PROCESSING ESCROW TRANSACTIONS

CROSS-REFERENCE TO RELATED APPLICATIONS

This application claims priority from U.S. Provisional Patent Application Ser. No. 60/198,785, filed Apr. 20, 2000, by C. Richard Triola.

STATEMENT REGARDING FEDERALLY SPONSORED RESEARCH OR DEVELOPMENT

None.

REFERENCE TO AN APPENDIX

None.

BACKGROUND OF THE INVENTION (5.1) Field of the Invention

The present invention relates generally to computer programs and, more specifically to a method and apparatus for processing escrow transactions and a method of doing business in escrow transactions using computers and computer network technology. More particularly, the present invention relates to a computerized method and apparatus for escrow transactions and a method of doing business in escrow transaction management, preferably using the Internet.

(5.2) Description of Related Art (5.2.1) Glossary

The following terms and definitions are provided for the convenience of the reader; no limitation on the scope of the invention is intended by this GLOSSARY nor should any be implied therefrom.

"Client-Server": A model of interaction in a distributed computer network system in which a program at one site sends a request to another site and then waits for a response. The requesting program is called the "client," and the program which responds to the request is called the "server." In the context of the World Wide Web ("www" or "web" defined hereinafter), the client is a "browser;" i.e., a program which runs on a computer of an end-user. A program and network computer which responds to a browser request by serving web pages and the like, is referred to as a "server." Specialized servers, such as dedicated electronic mail (defined hereinafter) servers are also known in the art.

"Electronic Mail" ("e-mail"): The process and software for sending and receiving of textual information and attachments thereto between end-users over a distributed computer network such as the internet; internet access providers often include e-mail service to its customers as part of the access software that allows the end user to dial into the internet.

"Hypertext Mark-up Language" ("HTML"): A standard coding convention and set of codes for attaching presentation and linking attributes to informational content within documents; the primary standard used for generating web documents. During a document authoring stage, the HTML codes (referred to as "tags") are embedded within the informational content of the document; when the document is subsequently transferred from a server to a client, the codes are interpreted by the browser and used to parse and display the document. In specifying how the browser is to display the document, HTML tags can be used to create hyperlinks to other web documents.

"HyperText Transport Protocol" ("HTTP"): The standard Internet (infra) client-server protocol used for the exchange of information such as HTML documents and client requests for such documents between a browser and the server. HTTP—or HML or the like—includes a number of different types of messages which can be sent from the client to the server to request different types of server actions. For example, a "get" message which has the format GET<URL> (defined hereinafter) causes the server to return the document or file located at the specified URL.

"Internet": A generic term for a collection of distributed, interconnected networks (ARPANET, DARPANET, World Wide Web, or the like) that are linked together by a set of industry standard protocols and the like to form a global, distributed network.

Web "Site": A computer system that serves informational content over a network using standard protocols of the web. Typically, a web site corresponds to a particular internet domain name, such as WIDGET.COM", and includes the content associated with a particular organization such as Widget Company. The term is generally intended to encompass both (1) the hardware/software server components that serve the informational content over the network, and (2) the "back-end" hardware-software components, including any non-standard or specialized components that interact with the server component to perform service for web site users.

"World Wide Web" (WWW or simply "web"): Refers generally to both (1) a distributed collection of interlinked, user-viewable hypertext documents ("web documents" or "web pages") that are accessible via the internet, and (2) the client and server software components which provide user access to such documents using standardized internet protocols. Currently, the primary standard protocol for allowing applications to locate and acquire web documents is HTTP, and the web pages are encoded using HTML. However, the terms "web" and WWW or "world wide web" as used herein are intended to encompass future mark-up languages and transport protocols which may be used.

(5.2.2.) Background of the Invention

In the main, an escrow is a third party to a transaction between a seller and a buyer (the buyer and seller are collectively referred to as the "principals"). A deed, a bond, money, a piece of property, or other valuable, is delivered to the third party—hereinafter referred to as the "escrow officer"—to be delivered by the officer to the grantee only upon the fulfillment of all the conditions precedent which are imposed upon the principals and are usually of the express terms and conditions of a purchase and sale agreement (also referred to more simply as the "sales contract" hereinafter). In essence, the property is placed in trust in an escrow account.

Escrow transactions can be for both personal and real property. Some states (e.g. California) provide for the use of licensed escrow agents when a sale of real estate is being transacted. For the purpose of describing the present invention, an exemplary escrow transaction for real estate is considered; no limitation on the scope of the invention is intended by the inventor nor should any be implied therefrom.

While computers are important tools for the buyers and sellers of a valuable property (jointly referred to as the "principals"), in the main, the use of actual purchase agreements, escrow services and associated contracts, such as loan agreements, are handled manually since the true identity of the principals and their agreement by signatur on the assorted contracts and documents involved is a critical, personal factor. Notarization on the more important documents is often required. The coordination of the various entities involved with the transfer of a real estate property—namely the principals, agents, real estate brokers, attorneys, lending institutions such as banks or other mortgage related institutions, insurance companies, government and quasi-governmental entities (such as county clerk offices, local real estate boards, state deed recording and tax departments, and the like), vendors (e.g., title companies, property inspectors, property assessors, home owners associations, and the like), and any and all other entities involved in the transaction to be escrowed, is assigned to a licensed escrow agent. In turn, the escrow agent usually must involve the aid of administrative assistants to track all of the required paperwork and transfer of funds necessary to complete the transaction. As can be imagined, the number of such real estate transactions in a single California county on a daily basis is enormous. Moreover, commercial realty transactions involve even more complex service involving even more service providers.

With the advent of the so-called computer age, lending institution have devised methods and apparatus for processing mortgages and other loans. Mortgages and other transactions involving banks and credit-loan associations have been the subject of computerization for many years. See, e.g., U.S. Pat. Nos.

U.S. Pat. No. 4,876,648, SYSTEM AND METHOD FOR IMPLEMENTING AND ADMINISTERING A MORTGAGE PLAN;

U.S. Pat. No. 5,924,084, NEGOTIATED MATCHING SYSTEM;

U.S. Pat. No. 5,930,776, LENDER DIRECT CREDIT EVALUATION AND LOAN PROCESSING SYSTEM;

U.S. Pat. No. 5,940,811, CLOSED LOOP FINANCIAL TRANSACTION METHOD AND APPARATUS;

U.S. Pat. No. 5,983,206, COMPUTER SYSTEM AND COMPUTER-IMPLEMENTED PROCESS FOR IMPLEMENTING A MORTGAGE PARTNERSHIP;

U.S. Pat. No. 5,966,699, SYSTEM AND METHOD FOR CONDUCTING LOAN AUCTION OVER COMPUTER NETWORK;

U.S. Pat. No. 5,991,745, REVERSE MORTGAGE LOAN CALCULATION SYSTEM AND PROCESS;

U.S. Pat. No. 5,995,947, INTERACTIVE MORTGAGE AND LOAN INFORMATION AND REAL-TIME TRADING SYSTEM;

U.S. Pat. No. 6,012,047, REVERSE MORTGAGE PROCESSING SYSTEM;

U.S. Pat. No. 6,016,482, ENHANCED COLLATERALIZED FUNDING PROCESSOR; and

U.S. Pat. No. 6,029,149, LENDER DIRECT CREDIT EVALUATION AND LOAN PROCESSING SYSTEM.

Buyers are often "pre-qualified" by a lending institution for a particular loan amount even before seeking the right property. As a result, one of the problems of the marketplace is that the cause of delays experienced in valuable property exchange escrow transactions have shifted from the lending institution to the escrow agent. In some states, e.g., California, real estate transactions are regularly conducted via an escrow.

With the establishment of the internet, the world wide web, and the like, the emergence of e-commerce has generated a need for a computerized method and apparatus for processing escrow transactions and a method of managing escrows using such tools.

BRIEF SUMMARY OF THE INVENTION

The present invention provides a method and apparatus for independent third party transaction facilitation, providing on-line digital escrow services.

The present invention provides a software system for offering secure escrow accounts for the acquisition of real and personal property and for business-to-business transactions using such vehicles as the internet, world wide web, wireless telecommunications and the like.

The present invention provides a method and apparatus for digital escrow transactions.

The present invention provides an internet (or the like) based automation system that provides for implementing, managing, and tracking escrow transactions which will be accessible for specific parties to a particular transaction.

The present invention includes security measures for digital escrow transactions.

The present invention provides for a web browser (or the like) for opening of escrow for both real and personal property via on-line entry of escrow instructions, and further including remote printing of escrow documents for party signatures or some other method of electronic signature, ordering all of escrow related services to appropriate service providers, accepting status updates for service providers and/or seller and/or buyer, viewing item status and activity associated with each escrow performance item, tracking of all fund transfers through all processes, and final closing of escrow.

The present invention provides a method and apparatus for safe and secure harbor of escrowing real and personal property and business-to-business transactions over vehicles such as the internet and wireless communications.

The present invention provides a method and apparatus for computerized digital escrow transactions including broker status, lender status, buyer & seller status, and the transaction servers coupled using multiple access such as internet, intranet, extranet, via all connectivity types which include but are not limited to wireless, satellite, dial-up, or leased communications.

The present invention provides a system for real-time or near-real-time escrow transactions including appropriate data, application, and web servers along with supporting network based applications to perform at least one of the following for authorized parties to an escrow:

receive/store escrow instructions upon submission by a party to the escrow (or their agent) via a computerized communications device;

disseminating instructions to all relevant parties by electronic means, fax, or physical delivery, including preference determination;

providing escrow documentation electronically;

providing escrow documentation approval;

automating order specified services through electronic means;

real-time and near-real-time display of escrow instructions, status, and activity;

providing for electronic personal identification authentication; and closing escrow;

release of escrow funds;

digital transfer of escrow funds.

In its basic aspect, the present invention provides an apparatus for escrow transactions, including: a computer based automation system, having components providing implementation, management, and tracking of escrow transactions, wherein data for implementing, managing, and tracking the escrow transactions is accessible for specific parties to said escrow transactions.

In another aspect, the present invention provides a client-server computer system for escrow of property, including: at least one client module associated with at least one client party for initiating an escrow process with at least one escrow party; and at least one server module associate with the escrow party, wherein a specific escrow account between said client party and said escrow party is established, maintained, tracked, and consummated via said client-server computer system.

In still another aspect, the present invention provides a computerized method for escrow such as the escrowing of property and business-to-business transactions, the method including: providing a computer based automation system of components, including components providing implementation, management, and tracking of the escrow wherein data for implementing, managing, and tracking the escrow transactions is accessible for specific parties to said escrow.

In yet another aspect, the present invention provides a process for a computerized escrow transaction including: providing escrow account, escrow status, broker status, lender status, buyer status, seller status, and vendor status via a centralized server associated with an escrow officer, and connecting parties to said computerized escrow transaction using multiple computer network access devices via connectivity types which include but are not limited to wireless, satellite, dial-up, or leased communications.

In another aspect, the present invention provides a system for real-time or near-real-time escrow transactions, including: appropriate data, application, and transactional management programs; and supporting network based applications to perform at least one of the escrow services selected from a group including: receiving and storing escrow instructions upon submission by a party to the escrow transaction via a computerized communications device; disseminating instructions to all relevant parties by computer; providing escrow documentation; providing escrow documentation approvals; automating order specified services; real-time and near-real-time display of escrow instructions, status, and activity; on-line digital identification authentication; transfer of ownership; closing escrow; releasing of escrow funds; and digital transfer of escrow funds.

In a further aspect, the present invention provides a method of doing business using an internet including: providing an on-line escrow account for parties to a transaction; providing on-line transactional account management services with respect to the on-line escrow account for said parties; and providing secure access to said on-line escrow account limited to the parties and third parties using on-line identification authentication.

In another aspect, the present invention provides a computer memory including: program code providing a client-server based automation system for an escrow transaction; program code providing implementation, management, tracking, and closing of specific escrow transactions; and program code allowing escrow transaction data access only for specific parties to said escrow transaction.

The foregoing summary is not intended to be an inclusive list of all the aspects, objects, advantages, and features of the present invention nor should any limitation on the scope of the invention be implied therefrom. This Summary is provided in accordance with the mandate of 37 C.F.R. 1.73 and M.P.E.P. 608.01 (d) merely to apprise the public, and more especially those interested in the particular art to which the invention relates, of the nature of the invention in order to be of assistance in aiding ready understanding of the patent in future searches. Objectives, features and advantages of the present invention will become apparent upon consideration of the following explanation and the accompanying drawings, in which like reference designations represent like features throughout the drawings.

BRIEF DESCRIPTION OF THE DRAWINGS

FIG. 3 is an exemplary computer screen display illustrating an exemplary, computerized Escrow Form in accordance with the present invention as shown in FIG. 1.

FIG. 4 is an exemplary computer screen display illustrating an exemplary, computerized escrow status internet page in accordance with the present invention as shown in FIG. 1.

The drawings referred to in this specification should be understood as not being drawn to scale except if specifically annotated.

DETAILED DESCRIPTION OF THE INVENTION

The system and method of operation of the present invention includes the use computerized devices and telecommunications devices connected to the Internet (or the like) which is adapted to perform:

receiving instructions for the opening of an escrow;

providing and sending digital instructions to all parties involved in the transaction;

offering the availability of a continuous digital escrow transaction by coordinating and permitting access to the on-going status of an escrow in progress;

on-line digital signature, voice, video fingerprint or retina scanning personal identification authentication;

transfer of funds or other consideration;

submission of loan documents;

closing escrow, delivering clear title, and release of transaction funds;

and the like as would be useful in an escrow transaction.

The apparatus and method implements, manages, and tracks on-line digital transactions via an escrow, including opening, servicing, real-time or near-real time status of the broker, title company, lender, vendor, buyer and seller, and closing of an escrow via a medium such as the internet. Multiple access methods are employed. The present invention provides digital computerization and internet type process implementation for escrows including, but not limited to:

escrow transaction coordination, escrow vendor service transaction coordination escrow status coordination and communication, seamless escrow transactions, party and third party personal identification authentication, such as on-line digital signature, thumb-print, retinal scan, video signature authentication, digital certificate authentication, and the like (generically referred to hereinafter as identification authentication; no limitation on the scope of the invention is intended by this list nor should any be implied), transmission of digital escrow instructions, and voice digital instructions, the merging of voice with escrow transactions, wireless escrow transactions, set-top/webTV escrow transactions, global digital escrow networking, including appropriate data, application, and servers along with supporting LAN or WAN-based application to perform escrow services, and the like. In other words, the present invention proposes a completely computerized and networked system for any type of escrow transaction.

Reference is made now in detail to a specific embodiment of the present invention which illustrates the best mode presently contemplated by the inventor for practicing the invention. Alternative embodiments are also briefly described as applicable.

Figure 1C:
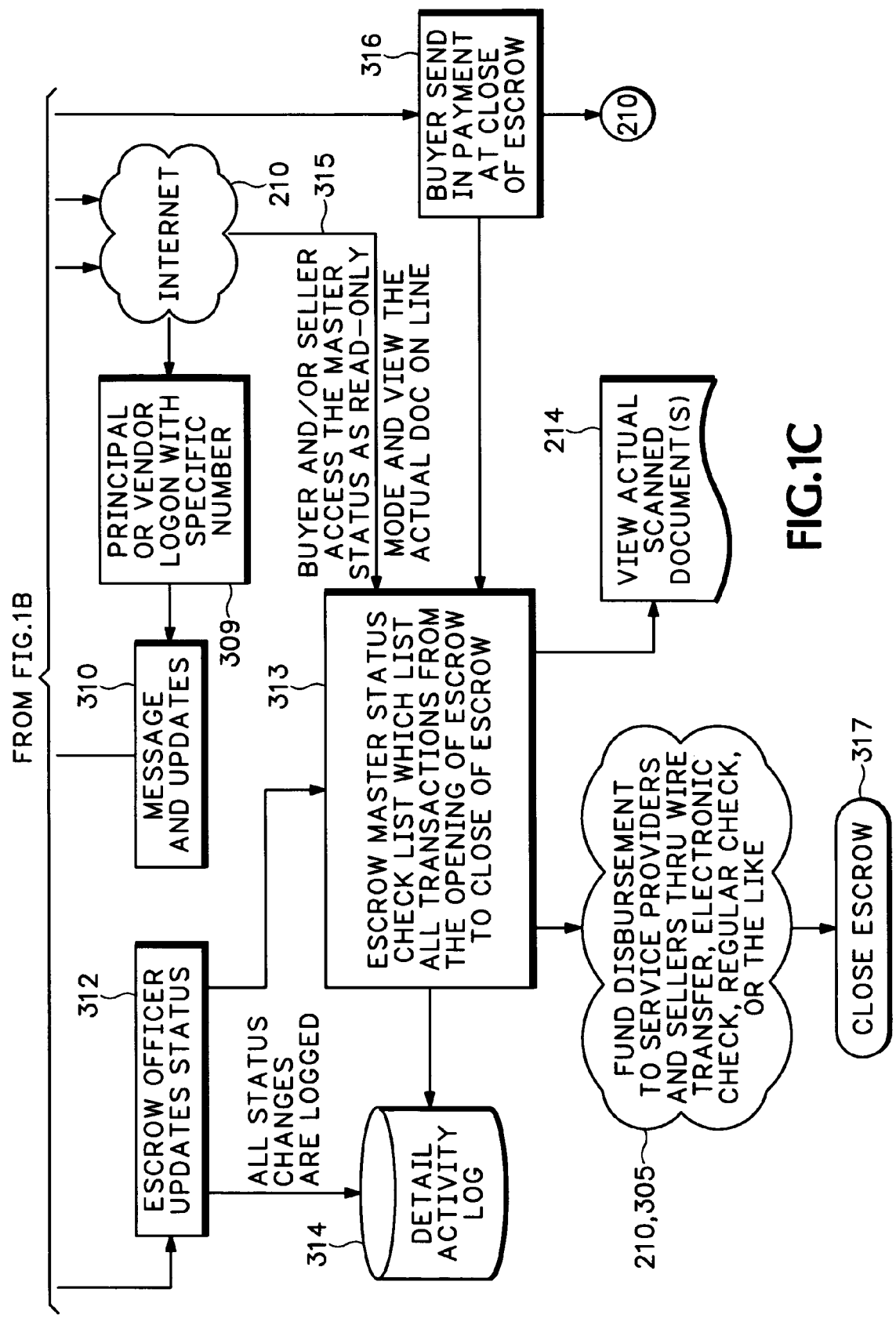
FIG. 1 is an illustration of the present invention.

Turning to FIG. 1, standard, commercially available, computing and network serving apparatus employed in accordance with the present invention are schematically illustrated and labeled for identification: laptop computers 201—or personal digital assistants, wireless internet ready devices, or the like—workstation computers 202, (all such computer microprocessor-based type devices used by or useful to individuals in accordance with the present invention are collectively and generically referred to hereinafter as simply "computers;" no limitation on the scope of the invention is intended nor should any be implied), network routers 204, memory apparatus 205, networking equipment 206, and programs for operating; labeled cloud-balloons are used to depict the Internet or localized extranet 210' services as known in the art. Provision can be made for foreign language use and interpretation. Digital handwriting recognition software can be employed.

The bulk of the equipment 202, 204, 205, 206 is located with an escrow officer 103 or escrow company employing the officer. In the main, a client-server relationship is provided between an escrow officer or company as the server and the other parties as the client. Note also that many if not all of the functions related to the escrow company may be automated. An advantage of the present invention is that the client and server need not even be located in the same country, for example, in an escrowed business transaction. One specific example is any transaction where a huge value of the commodity and consideration warrants escrow; e.g., the purchase of diamonds in the international market of the Netherlands by a buyer in some other country.

As an example transaction to describe the present invention, a real estate purchase and sale and escrow transaction will be used. This example is only used to simplify the detailed description of the present invention; no limitation on the scope of the invention is intended nor should any be implied.

Let it be assumed that the principals 101 and their respective real estate agent(s) 102 have consummated an offer and acceptance for a specific piece of property—step 301, "START." Further assume that the principals 101 and realty agent 102 have access to computers and associated printers, faxes, and the like, including appropriate Internet browser programs.

Figure 2:
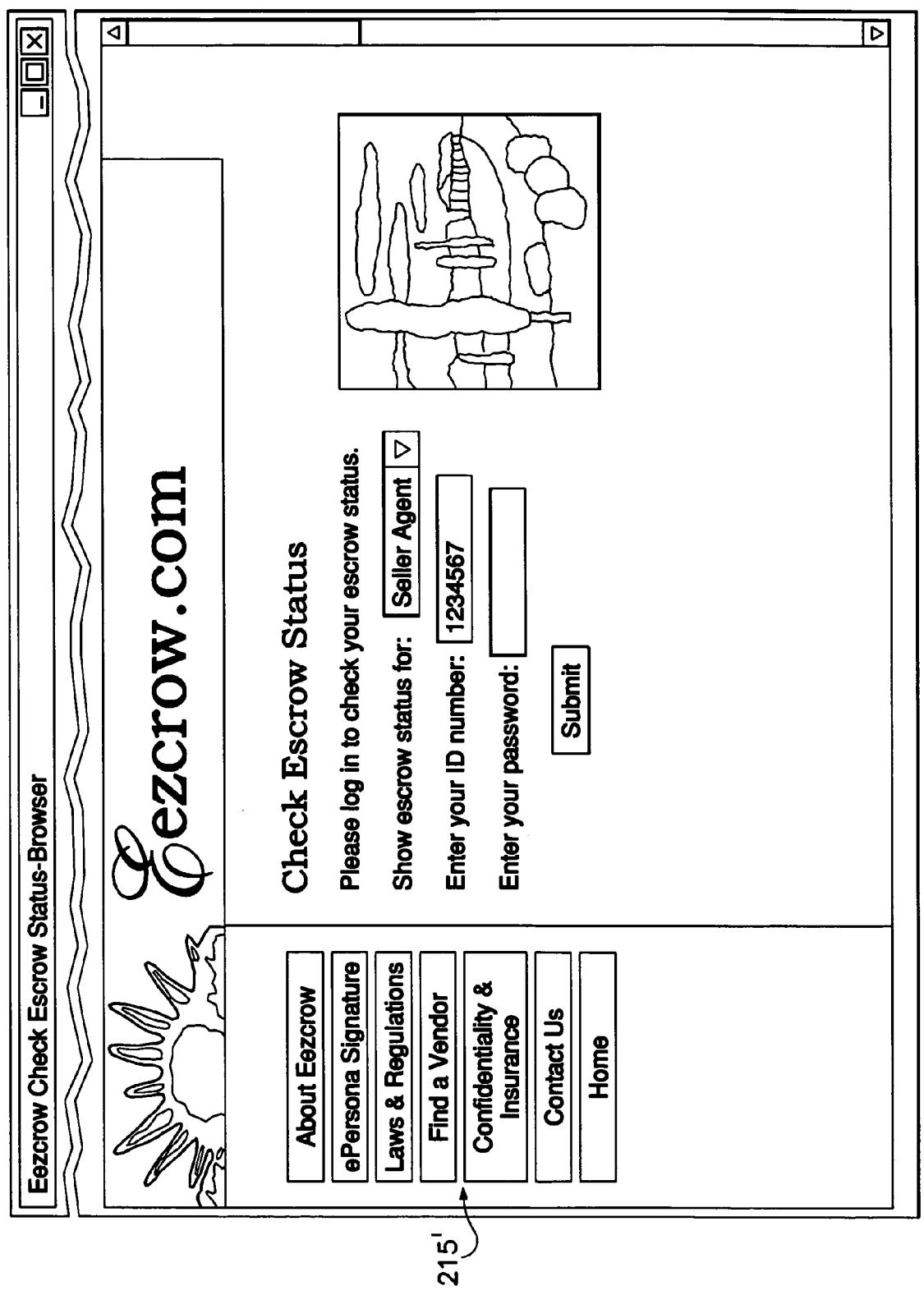
FIG. 2 is an exemplary computer screen display illustrating an exemplary, computerized Log In screen in accordance with the present invention as shown in FIG. 1.

A purchase agreement 207 has been signed by the principals 101. It is therefore been agreed to open an escrow account to handle the complex details of the transaction with a particular escrow agent, or "officer," 103. A principal's agent 102, having appropriate components of a program in accordance with the present invention—referred to hereinafter as EEZCROW™ program (EEZCROW is a trademark of EEZCROW Company of Laguna Beach, Calif.) loaded on a computer 201, using the internet 210, logs into the EEZCROW program—step 302, "Seller Login to Initiate Escrow Process"—connecting to the computer 201' or 202 of the escrow officer 103 representing the licensed escrow company involved. FIG. 2 is an exemplary computer screen 215 associated with a Log-In procedure in accordance with the present invention. Note that virtual buttons Personal identification authentication is an important part of the escrow process. Using one or more state of the art digital identification authentication technologies, the principals 101 and agent 102 and officer 103 are each provided with unique identities so that the escrow process will be completely secure and confidential. Other involved entities may be added as needed, e.g., lending institutions that may wish to transfer funds electronically.

Two transactions take place. First, a deposit in accordance with the signed purchase agreement 207 is transferred via the internet 210 to the escrow officer 103—step 303, "Deposit." A trust accounting system 400 is incorporated into the process. Fund data, such as credit card information, electronic checking, wire transfer, or the like, is procured from the seller 101. Second, the agent 102 provides the information that the escrow officer 103 will need to accomplish the various escrow tasks and obligations—referred to generically hereinafter as the "escrow order." The agent 102 uses forms provided as part of the EEZCROW program module, or other compatible electronic forms, on their computer 201—step 304, "Enter data using Short Form or Long Form." The form is then transmitted to the escrow officer via the Internet 210, the escrow officer having appropriate modules of the EEZCROW program on their computer(s) 201', 202. Note that this initial document, in Short Form or Long Form, basically resides in memory accessible by the escrow officer 103, such as the disk array 205. This memory is accessible by the escrow officer 103 through either an Internet or Extranet connection 210' from either a laptop 201' or office workstation 202. It should be recognized by those skilled in the art that appropriate security modules are used in accordance with the present invention for verification of all parties described and yet to be described, digital signature approval, documents and funds access, and the like. Additionally, the realty agent 102 may use their computer to transmit a copy of the signed purchase agreement 207 to the escrow officer 103—step 305.

FIG. 3 is an exemplary, computerized Escrow Instructions Form 304' as might appear on the computer 201 screen; see step 304. Again, having the appropriate modules of the EEZCROW program, the realty agent 102 provides the applicable data by filling in the blanks and the Form is transmitted back to the escrow officer 103. Moreover, any and all official documents associated with opening an escrow account is captured electronically (if not digitally available, scanned or the like) and transmitted with the Escrow Instructions Form.

It is now incumbent upon the escrow officer 103 to either complete the Escrow Instructions Form as an escrow order—step 306—or to review the order—step 307, and to create therefrom a specific, identifiable (e.g., by case number or other designator), and their escrow instructions document 212, spelling out the duties, rights, and obligations of the principals 101, the realty agent 101, and the escrow officer 103. The escrow officer 103—preferably via Internet, but if certain parties do not have access, via other distribution channels—then distributes the appropriate escrow instructions and orders any services that the escrow officer 103 is obligated to perform or have performed by service providers 104—step 308, "Escrow Instruction Distribution and Service Orders." In this process step, the escrow instruction documents distributed electronically are distributed with case identification and specific log-in instructions, including party identification and security password, for on-line access and personal digital identification authentications and signatures.

Any EEZCROW modules that principals may need to participate via the Internet are transmitted with the escrow instructions to that particular principal or reside at the workstation 202 where the principal can access forms or the like remotely from there own terminal. Note that the case file is thus available for party access to status check or update specific information for which they have a specific security key to access. For example, a lending institution may have a security key to access that section of the case file concerning a mortgage application and grant or denial status.

Each of the parties—the principals 101, realty agent(s) 102, and service providers/vendors 104—has access to the escrow account file residing on the escrow officer 104 company computer memory 205 via the Internet 210. The escrow account file is analogous to a web site. At any time, these parties 101, 102, 104 can log—step 309 and, using the specific escrow account number and their security key, can provide updates or other messages to the escrow officer 103—step 310. The escrow officer 104 is kept apprised of all activity, preferably via electronic mail messages—step 311—stored in main memory 205 or an auxiliary memory (schematically represented by the barrel shaped icon in FIG. 1). Note that in order to ensure proper escrow processing, it may be provided that all updates 310 are actually funneled through the escrow office 103 for entering into the escrow account file—step 312.

It is generally the escrow officer's 103 duty to maintain the escrow Master Status record—step 313. This includes the review and verification, or questioning of, important documents—e.g., grant deeds, certificates of ownership, title insurance policies loan documents and applications, homeowners association documents, zoning disclosure reports, home warranty policies, pest and other property inspection reports, natural hazard disclosures, geological reports, lead-based paint inspections, escrow settlement statements, government and quasi-government forms (e.g. CAL-FIRPTA, RESPA, Megan's Law, and the like), and the like documents 214—which are necessary, or advisable, to completing the escrow. The escrow officer 103 will keep a detailed escrow activity log as part of the escrow account file—step 314. Note that as the principals 101 have individual and somewhat conflicting agendas in completing the transaction, the principals access to the Master Status record 313 is preferably kept to a "read only" mode, path 315. In other words, while a buyer or seller might provide update information 310 to the escrow officer 103 for appropriate action or inaction, they have no security key to access the actual Master Status record 313. FIG. 4 is an exemplary computer screen display 401 demonstrating an escrow account status in accordance with the present invention.

Once all conditions of the escrow have been met, the buyer sends in the necessary funds to close escrow—step 316. The escrow officer 102 then completes all the necessary requirements—such as recording deeds, transfer of title (including title insurance), distribution of payments, and the like—necessary or important documents to close the escrow—step 317.

The foregoing description of the preferred embodiment of the present invention has been presented for purposes of illustration and description. It is not intended to be exhaustive or to limit the invention to the precise form or to exemplary embodiments disclosed. Obviously, many modifications and variations will be apparent to practitioners skilled in this art. Similarly, any process steps described might be interchangeable with other steps in order to achieve the same result. The embodiment was chosen and described in order to best explain the principles of the invention and its best mode practical application, thereby to enable others skilled in the art to understand the invention for various embodiments and with various modifications as are suited to the particular use or implementation contemplated. It is intended that the scope of the invention be defined by the claims appended hereto and their equivalents. Reference to an element in the singular is not intended to mean "one and only one" unless explicitly so stated, but rather means "one or more." Moreover, no element, component, nor method step in the present disclosure is intended to be dedicated to the public regardless of whether the element, component, or method step is explicitly recited in the following claims. No claim element herein is to be construed under the provisions of 35 U.S.C. Sec. 112, sixth paragraph, unless the element is expressly recited using the phrase "means for . . . . "

What is claimed is:

1. A Web-based client-server computer system for escrow office related processes of real estate title transfer, comprising:
   at least one client module associated with at least one client party for initiating an escrow process with at least one escrow company; and
   at least one server module associate with the escrow company as a server party,
   wherein a specific escrow account between said client party and said escrow company is established, maintained, tracked, and consummated via said client-server computer system.

2. The system as set forth in claim 1, comprising:
   on-line entry and transmission of escrow initiation, escrow instructions, escrow status tracking, and escrow consummation between the server party and the client party.

3. The system as set forth in claim 1, the at least one server module associated with the escrow party further comprising:
   on-line entry and transmission of service provider data between the server party and at least one service provider.

4. The system as set forth in claim 1, comprising:
   computer code providing data security.

5. The system as set forth in claim 1, comprising:
   computer code providing for digital identity authentication for each party.

6. The system as set forth in claim 1, comprising:
   digital tracking of funds or other buyer-seller compensation arrangements, and disbursement of said funds or other buyer-seller compensation at or after final closing of said escrow process.

7. The system as set forth in claim 1, comprising:
tracking of all documentation required and advised for the escrow process.

8. Computerized, on-line method for real estate escrow processes performed by an escrow company holding an escrow account, the method comprising:
providing a computer based automation system of components, including components providing implementation, management, and tracking of the escrow real estate transfer wherein data and documents for implementing, managing, and tracking the real estate escrow processes of a real estate transfer are accessible on-line for specific parties to said escrow account.

9. The method as set forth in claim 8 comprising:
distributing said components as computer code modules residing at principals and parties to said escrow account for providing party-associated data entry and access.

10. The method as set forth in claim 9 comprising:
including security measures providing for a variety of data entry and access levels to said escrow data and documents.

11. A computerized process for a computerized on-line real estate escrow office account, the process comprising:
providing escrow account data and electronic documents, escrow status, broker status, lender status, buyer status, seller status, and vendor status via a centralized server associated with an escrow officer; and
connecting parties to said computerized on-line real estate escrow office account using multiple computer network access devices via connectivity types which include but are not limited to wireless, satellite, dial-up, or leased communications.

12. A system for real-time or near-real-time real estate escrow company account processes and documentation, the system comprising:
on-line Internet communications programs;
associated with said Internet communications programs, appropriate data, electronic documents, application and transactional management network programs, and including supporting network based applications for performing at least one of the escrow services selected from a group including
receiving and storing escrow instructions upon submission by a party to the escrow transaction via a computerized communications device;
disseminating instructions to all relevant parties by computer;
providing escrow documentation;
providing escrow documentation approvals;
automating order specified services;
real-time and near-real-time display of escrow instructions, status, and activity;
on-line digital identification authentication;
transfer of ownership;
closing escrow;
releasing of escrow funds; and
digital transfer of escrow funds.

13. A method of doing business in realty using on-line communications, the method comprising:
providing an on-line escrow account for parties to a transaction;
providing on-line transactional account management services with respect to the on-line escrow account for said parties; and
providing secure access to said on-line escrow account limited to the parties and third parties using on-line identification authentication.

14. A computer memory having a program for real estate escrow company accounts comprising:
program code providing a client-server based automation system for said real estate escrow company accounts;
program code providing implementation, management, tracking, electronic documentation, and closing of specific escrow company accounts; and
program code allowing escrow data access only for specific parties to said escrow company accounts.

15. The memory as set forth in claim 14 wherein said program code allowing escrow data access only for specific parties to said escrow transaction further comprises:
program code for identification authentication.

16. The memory as set forth in claim 14 wherein said program code providing implementation, management, tracking, and closing of specific escrow company accounts further comprises:
program code for digital signatures.

17. The memory as set forth in claim 14 comprising:
program code for a method of doing business using an internet, the code including computerized processes for providing an on-line escrow account for parties to a real estate sale transaction, providing on-line transactional account management services with respect to the on-line escrow account for said parties, and providing secure access to said on-line escrow account limited to the parties and third parties using on-line identification authentication.

18. A computer based automation system for escrow processes and documentation using Internet computing technology, said system comprising:
means for implementing, managing, and tracking real estate transfer and real estate financing processes by and among principal parties and their agents with respect to an escrow company account requiring said processes and documentation; and
means for providing data and documents associated with said implementing, managing, and tracking such that said data and documents are accessible to said principal parties thereto and their agents and officers of said escrow company account via Internet.

* * * * *